United States Patent
Moon et al.

(10) Patent No.: US 7,360,928 B2
(45) Date of Patent: Apr. 22, 2008

(54) TILTING DEVICE

(75) Inventors: Yang-Ho Moon, Ansan-si (KR); Dong-Won Choi, Suwon-si (KR); Jae-Kyung Kim, Ansan-si (KR); Chil-Sung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 122 days.

(21) Appl. No.: 11/340,799

(22) Filed: Jan. 27, 2006

(65) Prior Publication Data

US 2006/0227399 A1 Oct. 12, 2006

(30) Foreign Application Priority Data

Apr. 7, 2005 (KR) .................... 10-2005-0028836

(51) Int. Cl.
*F21V 7/04* (2006.01)
*G02B 26/08* (2006.01)
*G02B 5/08* (2006.01)
*G02B 7/182* (2006.01)
*G03B 21/28* (2006.01)

(52) U.S. Cl. .............. 362/297; 362/346; 362/284; 359/226; 359/850; 359/872; 353/99

(58) Field of Classification Search .............. 359/198, 359/199, 201, 203, 212, 223, 224, 226, 872, 359/522, 846, 850, 855–857, 876, 196, 871; 362/277, 282, 284, 296, 297, 304, 305, 322, 362/324, 346, 341, 319, 323, 269, 271, 283, 362/285, 35; 353/84, 98, 99, 46, 50, 51
See application file for complete search history.

(56) References Cited

U.S. PATENT DOCUMENTS

| 6,351,324 | B1 * | 2/2002 | Flint ........................ 359/202 |
| 6,676,266 | B2 * | 1/2004 | Dromaretsky ............ 359/872 |
| 6,705,745 | B1 * | 3/2004 | Pederson ................. 362/284 |
| 6,729,734 | B2 * | 5/2004 | Childers et al. ........... 353/122 |
| 7,052,142 | B2 * | 5/2006 | Gupta ....................... 353/46 |

* cited by examiner

*Primary Examiner*—Jong-Suk (James) Lee
*Assistant Examiner*—David R Crowe
(74) *Attorney, Agent, or Firm*—Stanzione & Kim, LLP

(57) ABSTRACT

A tilting device is disclosed which tilts the light reflected from a Digital Micro-mirror device by a certain angle and projects it to a screen. The tilting device, comprising a first reflector surface, a second reflector surface inclined at a predetermined angle with regard to the first reflector surface, a holder attached to the bottom of the first reflector surface and the second reflector surface, and a driving part that provides rotational force to the holder, wherein the first reflector surface and the second reflector surface are rotated by the driving part to sequentially reflect light emitted from a Digital Micro-mirror device, not only provides a smooth and natural display with invisible grids but also allows more stable and more accurate tilting.

15 Claims, 7 Drawing Sheets

TILTING DEVICE

CROSS-REFERENCE TO RELATED APPLICATIONS

This application claims the benefit of Korean Patent Application No. 2005-28836 filed with the Korea Industrial Property Office on Apr. 7, 2005, the disclosure of which is incorporated herein by reference.

BACKGROUND OF THE INVENTION

1. Field of the Invention

The invention relates to a tilting device, particularly to a tilting device which repeatedly tilts light reflected from a Digital Micro-mirror device.

2. Description of the Related Art

An image projection device using Digital Light Processing (DLP), in which the mosaic phenomenon in pixels, a problem in regular Liquid Crystal Display (LCD) imaging devices, is eliminated to improve the ability to reproduce original colors, is used widely in theaters, conference rooms, and projection TV's, etc. The image projection device can be divided into a Front Projection device and a Rear Projection device according to the projection method.

The Front Projection device adopts the method of projecting image signals from the front, and is generally used in theaters, conference rooms, etc. On the other hand, the Rear Projection device adopts the method of projecting image signals from the rear of the screen. The Rear Projection device is commonly used in the form of projection TV's. In particular, Rear Projection devices are used more often than Front Projection devices, because of its ability to display a relatively bright image even in a bright environment.

FIG. 1 is a perspective view illustrating a conventional image projection device, and FIG. 2 is a schematic drawing illustrating the pixel structure shown on a screen by a conventional image projection device.

As shown in FIG. 1, a conventional image projection device comprises a lamp 11, a condenser lens 13 which collimates and irradiates light emitted from the lamp 11, a color wheel 15 which separates the collimated white light into red (R), green (G), and blue (B) colors and illuminates ⅓ for every frame, a collimation lens 17 which irradiates parallel the light emitted from the color wheel 15 for each color, a Digital Micro-mirror device (hereafter referred to as "DMD") 19 which adjusts the reflection angle for each pixel of the light collimated from the collimation lens 17 for each color to form a picture, and a projection lens 21 which projects the light from the DMD to a large display of a screen S.

On the DMD 19 are formed numerous micro-mirrors (not shown), which are minute in size and are associated with a pixel structure on a silicon wafer, and these micro-mirrors convert the path of the incident light on/off by individually undergoing a highly rapid tilting motion according to the digital information provided to the DMD 19 by a controller. The pixels controlled individually by the DMD 19 are magnified through a projection lens 21 so that a large display picture is formed on the screen S.

As described above, since conventional image projection devices form a large display simply through the magnified projection of the small original picture, there is the problem that the picture quality is degraded due to the grid pattern formed between each pixel P Also, there is a problem in that when the picture moves rapidly or where the line of sight of the viewer moves rapidly, the picture is formed on the screen with rainbow colors showing where the contrast ratio is great, for example where there are black stripes on a white background, or with the grid pattern between each pixel notably significant.

SUMMARY OF THE INVENTION

It is an object of the invention to provide a tilting device that provides a smooth and natural display.

It is also an object of the invention to provide a tilting device that allows more stable and more accurate tilting.

Additional aspects and advantages of the present general inventive concept will be set forth in part in the description which follows and, in part, will be obvious from the description, or may be learned by practice of the general inventive concept.

According to an aspect of the invention, a tilting device is provided, comprising: a first reflector surface, a second reflector surface inclined at a predetermined angle with regard to the first reflector surface, a holder attached to the bottom of the first reflector surface and the second reflector surface, and a driving part which provides rotational force to the holder, wherein the first reflector surface and the second reflector surface are rotated by the driving part to sequentially reflect light emitted from a DMD.

The second reflector surface tilts light by an amount corresponding to ½ of the vertical distance between pixels shown on a screen and reflects it to the screen. The first reflector surface and the second reflector surface are a pair of halves that form a circle. Preferably, the adhesion part of the first reflector surface and the second reflector surface is blackened to prevent the dispersion of light.

Preferably, the holder comprises a first holding groove and a second holding groove, and the first reflector surface is inserted and fixed in the first holding groove, and the second reflector surface is inserted and fixed in the second holding groove. Preferably, the first reflector surface and the second reflector surface are processed from a single mirror, to easily process a mirror. Preferably, the driving part is coupled to a color wheel motor and rotated. The driving part may be coupled to a color wheel motor by a gear or a belt.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
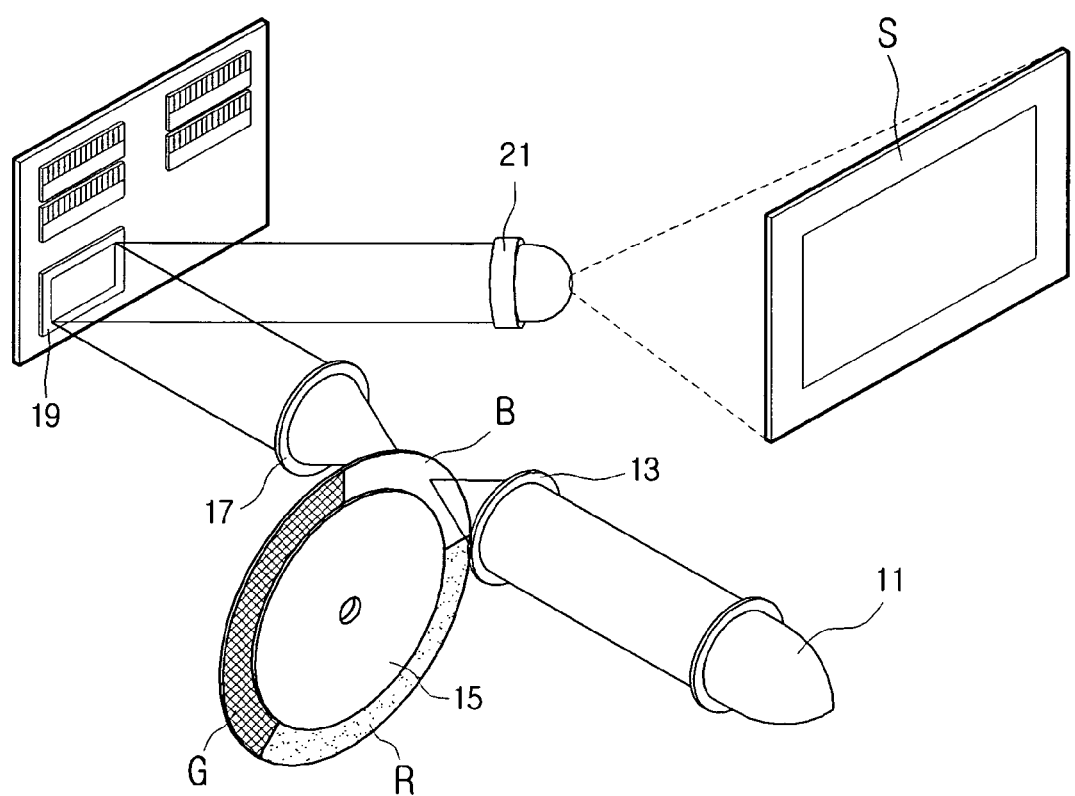
FIG. 1 is a schematic drawing of a conventional image projection device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3A:
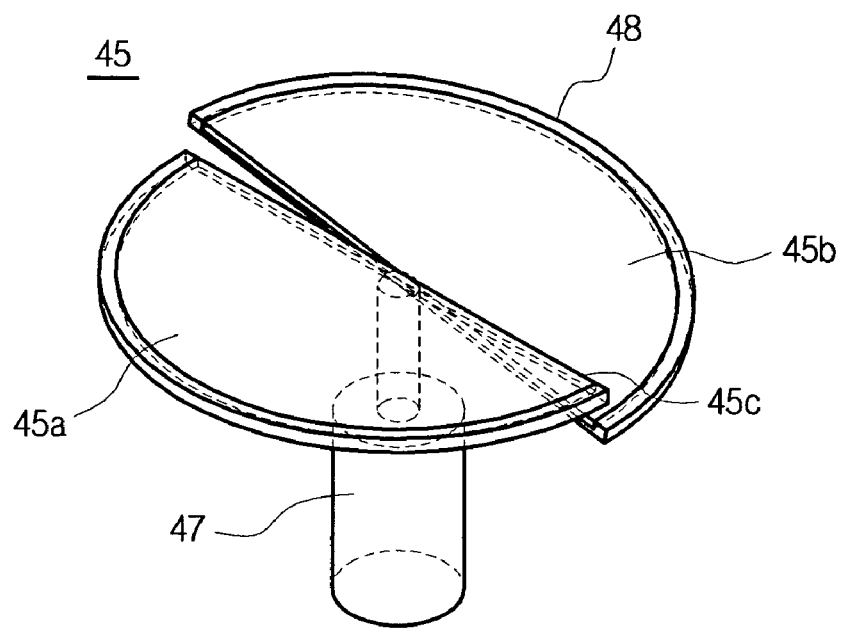
FIG. 3a is a perspective view illustrating a tilting device according to an embodiment of the invention.
Figure 3B:
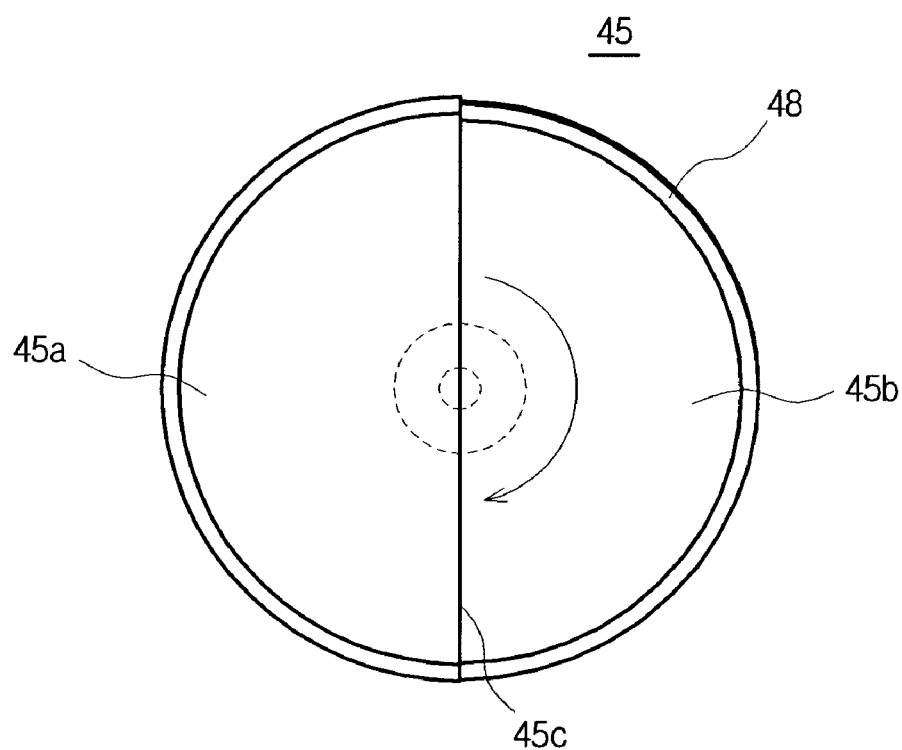
FIG. 3b is a plan view illustrating a tilting device according to an embodiment of the invention.
Figure 3C:
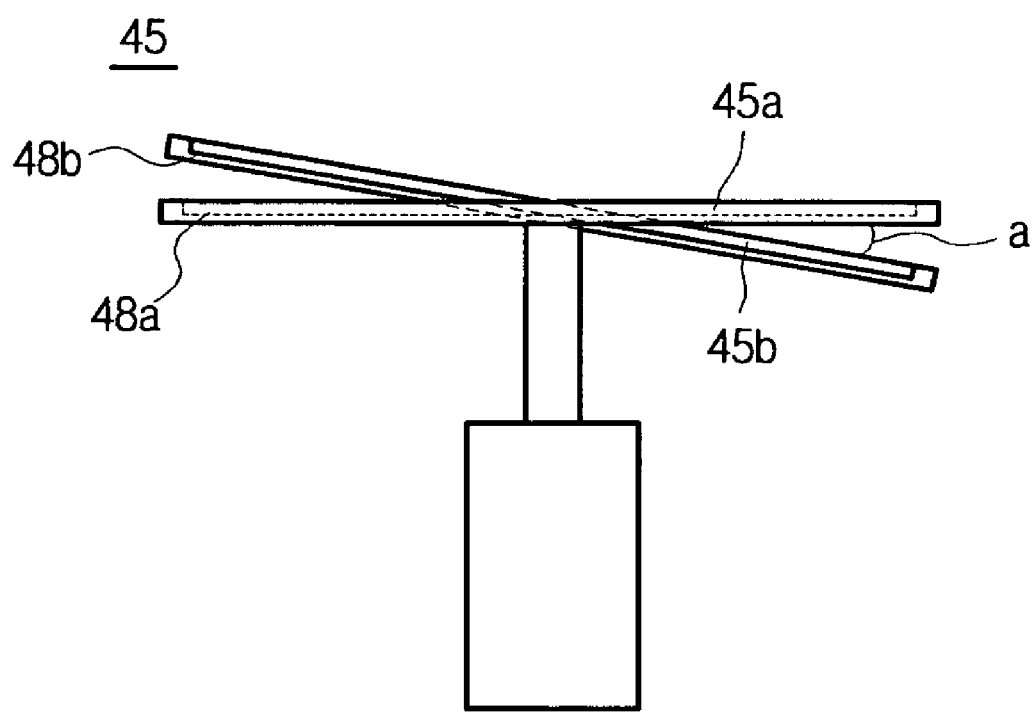
FIG. 3c is a side elevation view illustrating a tilting device according to an embodiment of the invention.

FIG. 3a to FIG. 3c are a perspective view, a plan view, and a side elevation view illustrating a tilting device according to an embodiment of the invention. The tilting device 45 as shown in FIG. 3a to FIG. 3c comprises a first reflector surface 45a, a second reflector surface 45b inclined at a predetermined angle with regard to the first reflector surface 45a, a holder 48 affixing the first reflector surface 45a and the second reflector surface 45b, and a driving part 47 which provides rotational force to the holder 48.

The first reflector surface 45a and the second reflector surface 45b are a pair of halves, which are attached to each other to form a circular mirror. Of course, for convenience in processing, the first reflector surface 45a and the second reflector surface 45b may be formed from a single mirror. Here, the second reflector surface 45b is processed to maintain a certain angle of inclination with respect to the first reflector surface 45a. Also, the first reflector surface 45a and the second reflector surface 45b may join to form various shapes such as an oval or a quadrilateral.

Figure 7:
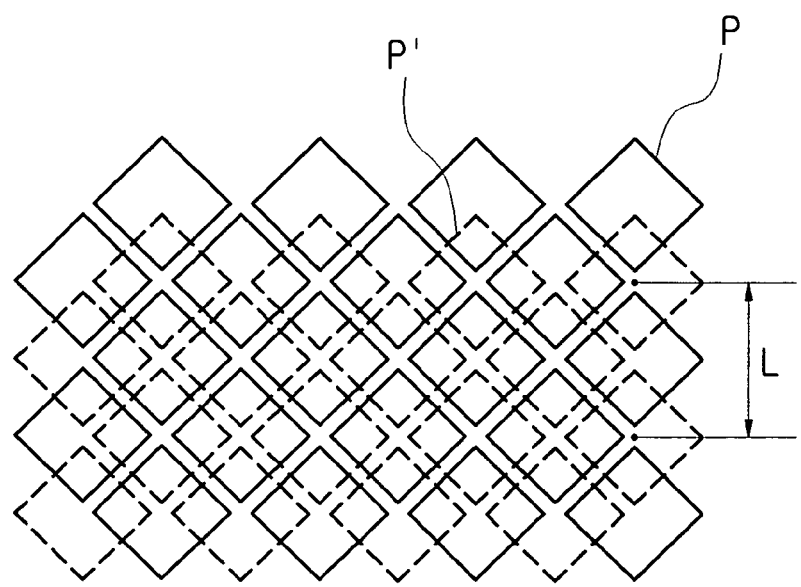
FIG. 7 is a schematic drawing illustrating the pixel structure shown on a screen by a tilting device according to an embodiment of the invention.

The second reflector surface 45b is inclined at a predetermined angle with regard to the first reflector surface 45a. The second reflector surface 45b, as shown in FIG. 7, is inclined at an angle that can raise or lower the pixel structure shown on a screen by an amount corresponding to ½ of the vertical distance L between pixels. This angle of inclination a is further determined in detail by the distance between the tilting device 45 and the screen S, the size of the display on the image projection device, etc.

The holder 48 is attached to the bottom of the first reflector surface 45a and the second reflector surface 45b and affixes the first reflector surface 45a and the second reflector surface 45b. The holder 48 has a first holding groove 48a and a second holding groove 48b inclined by an angle of a° with respect to the first holding groove 48a. The first reflector surface 45a and the second reflector surface 45b are each inserted into the first holding groove 48a and the second holding groove 48b and affixed. Thus, the first reflector surface 45a and the second reflector surface 45b, which are rotated at approximately 60 rpm by the driving part 47, are affixed and stable. The holder 48 is connected to the driving part 47 and rotated.

The driving part 47 is joined with the holder 48 at the bottom of the holder 48. The driving part 47 may be of any composition that can provide rotational force to the holder 48, and a motor is generally used. The driving part 47 may be mechanically joined to the driving means of a color wheel (not shown) using a gear or a belt. A color wheel generally rotates at a speed of 7200 rpm, and to decrease the speed to 60 rpm, the rotational speed of the holder 48, the gear ratio may be adjusted, or the radius of the belt pulley may be adjusted.

Figure 4:
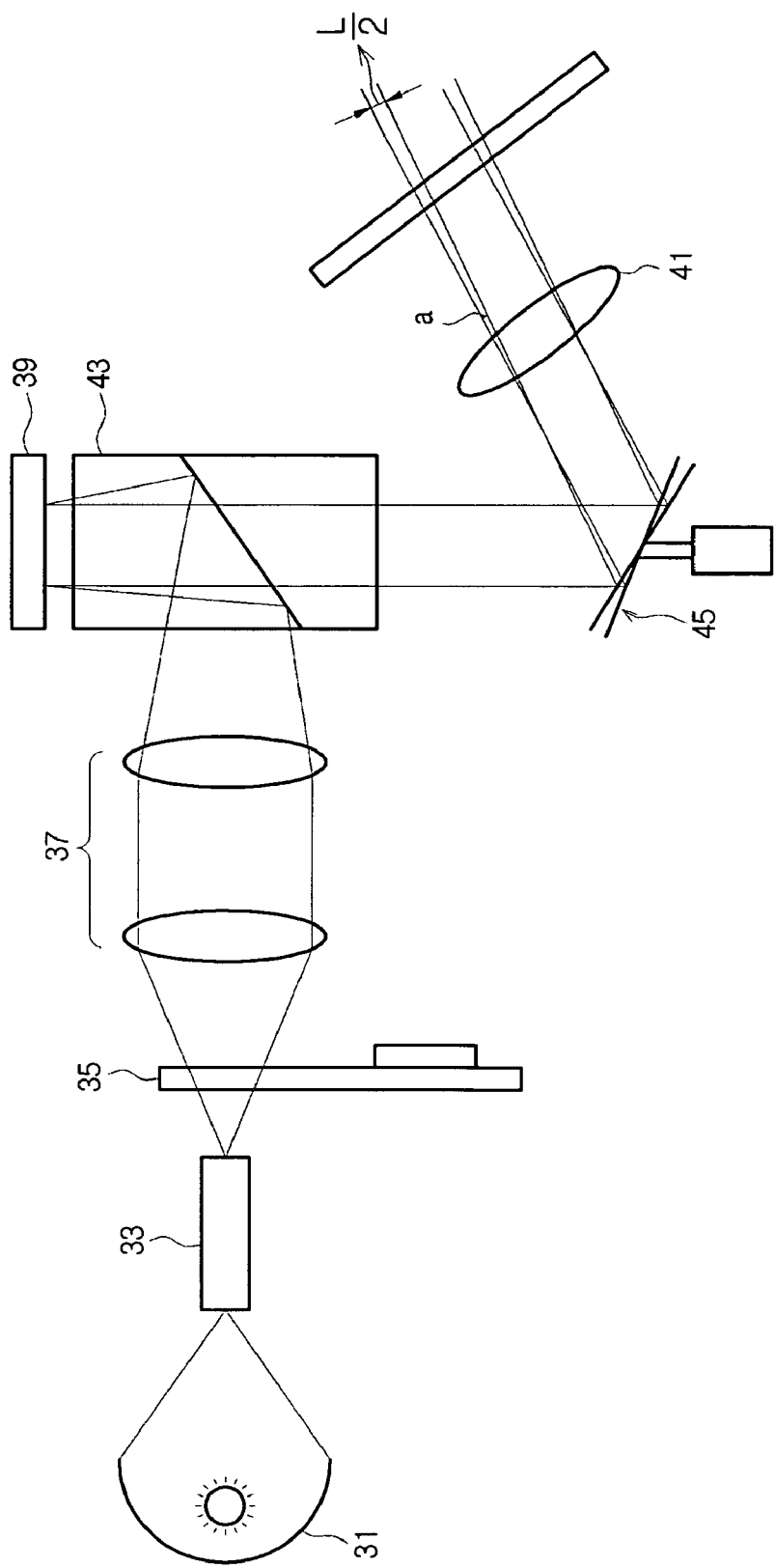
FIG. 4 is a schematic drawing illustrating the operation of a tilting device according to an embodiment of the invention.
Figure 5:
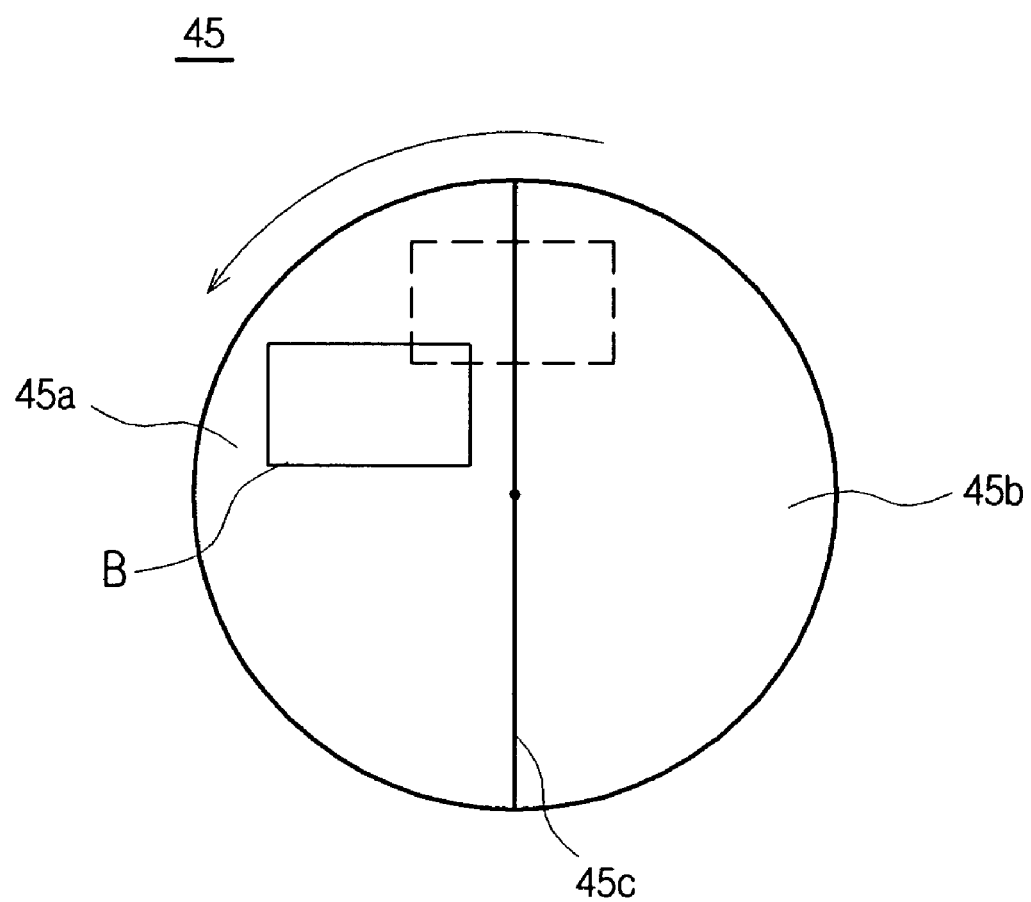
FIG. 5 is a schematic drawing illustrating the incidence of light from a Digital Micro-mirror device on a tilting device according to an embodiment of the invention.

As shown in FIG. 4, a rectangular beam reflected from the DMD 39 is incident upon the first reflector surface 45a or the second reflector surface 45b. However, the rectangular beam may, as represented by the dotted lines, be incident across the adhesion part 45c of the first reflector surface 45a and the second reflector surface 45b due to the rotation of the first reflector surface 45a or the second reflector surface 45b. Therefore, the adhesion part 45c is blackened to prevent the dispersion of light. In other words, the adhesion part 45c is formed with paint or coating that can absorb light, to prevent the dispersion of light. Alternatively, a tape etc. that can absorb light may be applied. Preferably, the first reflector surface 45a and the second reflector surface 45b are formed with sizes greater than that of the rectangular beam generated by the DMD 39, as shown in FIG. 5.

Before describing the operation of the tilting device of the invention, an overall description will be given below of the composition of an image projection device in which a tilting device is used.

FIG. 4 is a schematic drawing showing the operation of an image projection device in which a tilting device is used, according to a preferred embodiment of the invention. In FIG. 4 is illustrated a light source 31, a color wheel 33, a rectangular beam generator part 35, collimation lenses 37, a DMD 39, a prism 43, and a tilting device 45 according to an embodiment of the invention.

The light source 31 provides to the color wheel 33 a white light comprising a plurality of monochromatic lights of different wavelengths, for example R (Red), G (Green), and B (Blue) monochromatic lights. A laser, mercury lamp, metal halide lamp, halogen lamp, or xenon lamp, etc. may be used as the light source 31.

The color wheel 33 is rotated by a rotation means (not shown), and is divided into the R (Red), G (Green), and B (Blue) zones. The white light emitted from the light source 31 is sequentially divided into R, G, B monochromatic lights by the R, G, B zones of the color wheel 33. Each zone of the color wheel is suitably coated according to the characteristics of each monochromatic light, and transmits the monochromatic light corresponding to each zone.

The rectangular beam generator part 35 converts the monochromatic light transmitted from the color wheel 33 to a rectangular beam having a predetermined length-width ratio. To do so, the rectangular beam generator part 35 uses a light tunnel or a glass rod. The light tunnel has a hexahedral shape, with a through hole in the middle. Also, mirrors are formed on the four sides inside the light tunnel. The respective R, G, B monochromatic lights that have passed through the color wheel 33 are converted to a rectangular beam within the light tunnel and emitted. Thus, a light with uniform intensity enters the DMD 39. The glass rod has a shape without a through hole and emits R, G, B monochromatic light respectively through total reflection.

The collimation lens 37 plays the part of irradiating the light emitted from the rectangular beam generator part 35 to be parallel to the prism 43. The prism 43 is a TIR (Total Internal Reflection) prism, which allows the monochromatic lights that have passed through the collimation lens 37 to be incident on the micro-mirror (not shown) of the DMD 39 through total reflection.

The DMD 39 is a semiconductor about an inch in size, and on a surface of the DMD 39 are formed micro-mirrors (not shown) produced to be extremely minute, the number of which ranges from a minimum of 480 thousand to 1.9 million. One micro-mirror is responsible for one pixel structure, and these numerous micro-mirrors are controlled independently to modulate the monochromatic lights, i.e. the image. Each 16 μm aluminum alloy micro-mirror formed above a cell of a SRAM (Static Random Access Memory) is given an inclination of ±10° according to the on/off state. The micro-mirrors mounted on the support are operated by the electrostatic field action of the memory directly underneath. By adjusting the time that the projected light is reflected or not reflected by the micro-mirrors, and allowing a person to see the brightness corresponding to the time accumulation, the brightness/darkness may be expressed of each pixel on the display.

The projection lens 41 projects the light tilted by the tilting device 45 to the screen S, thereby allowing a large display to be created.

Hereafter, the operation of a tilting device of the invention will be described in reference to FIG. 5 to FIG. 7.

Figure 6:
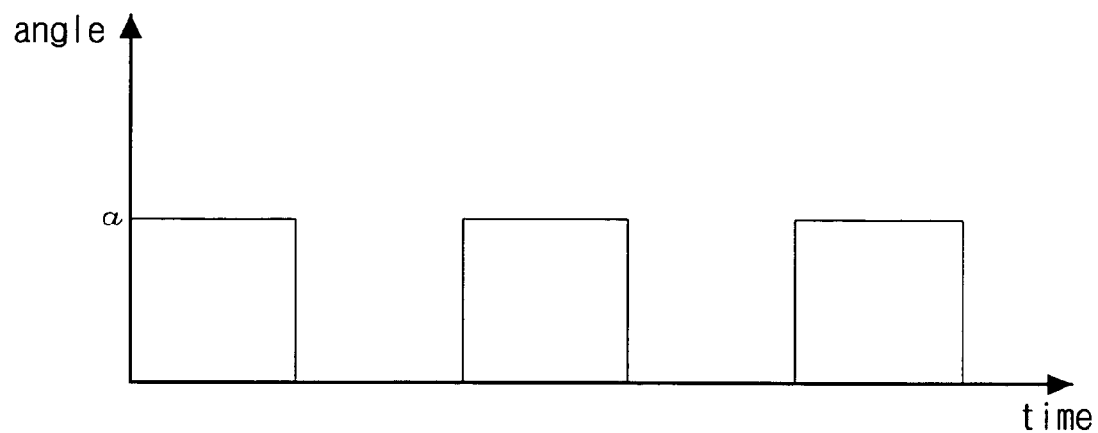
FIG. 6 is a graph illustrating change in tilting angle with respect to change in time by a tilting device according to an embodiment of the invention.

FIG. 5 is a schematic drawing illustrating the incidence of a rectangular beam from the DMD 39 on a tilting device according to a preferred embodiment of the invention, and FIG. 6 is a graph illustrating change in tilting angle with respect to change in time by the tilting device.

As illustrated in FIG. 5, the rectangular beam from the DMD 39 is projected onto the first reflector surface 45*a* or the second reflector surface 45*b* of the tilting device 45. Since the tilting device 45 rotates at a constant speed, the rectangular beam is sequentially positioned on the first reflector surface 45*a* and the second reflector surface 45*b*. Here, when the rectangular beam is projected onto the inclined second reflector surface 45*b*, the rectangular beam is tilted by an angle of a° by the second reflector surface 45*b* and is incident on the screen S, as illustrated in FIG. 4.

Therefore, plotting the angle by which the rectangular beam is tilted according to time yields a graph such as shown in FIG. 6. The period of the graph of FIG. 6 is T. As found in the graph of FIG. 6, the rectangular beam is not tilted when it is projected onto the first surface 45*a*, i.e. for the duration of T/2. Also, during the time of T/2 when the rectangular beam is projected onto the second surface 45*b* by the rotation of the tilting device 45, the tilting angle is immediately changed from 0° to a°. Since there is no occurrence of overshooting or rising time while the tilting angle is changed from 0° to a°, stable tilting is possible.

FIG. 7 is a schematic drawing illustrating the pixel structure shown on a screen by an image projection device according to a preferred embodiment of the invention. In FIG. 7, pixels P generated by an untilted rectangular beam are superposed over pixels P' formed by a tilted rectangular beam.

Figure 2:
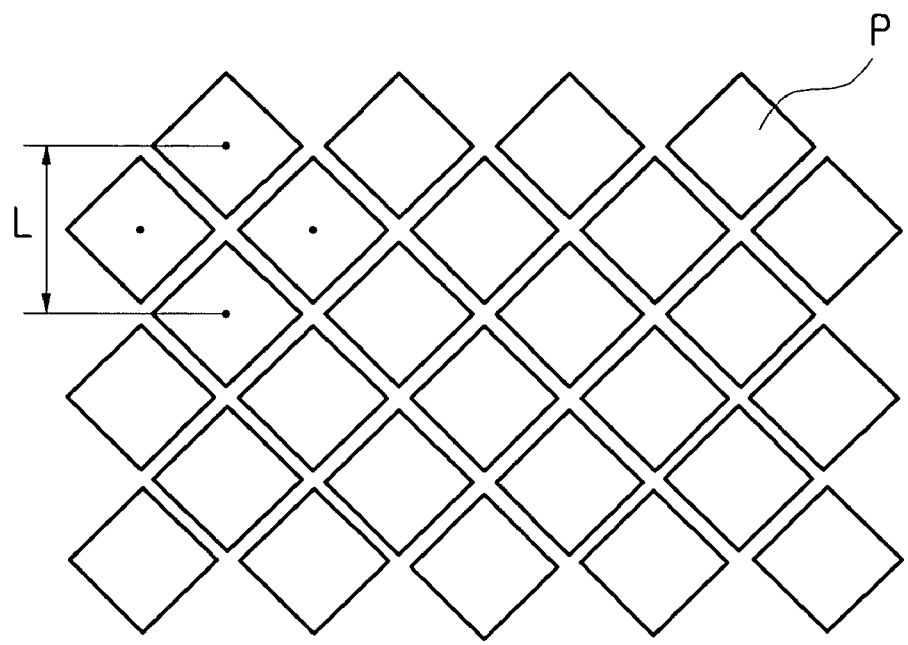
FIG. 2 is a schematic drawing illustrating the pixel structure shown on a screen by a conventional image projection device.

First, when the rectangular beam is positioned on the first surface 45*a*, an array of pixels P such as shown in FIG. 2 is formed. In FIG. 2, the vertical distance between each pixel P is L. When the rectangular beam is positioned on the second reflector surface 45*b* due to the rotation of the tilting device 45, the rectangular beam is tilted by a° to form an array of pixels P' raised by L/2 on the screen S. As described above, because the rotational speed of the tilting device 45 is very high, such as 60 Hz, the visual afterimage effect causes the tilted pixels P' to be perceived as being continually displayed on the screen. Thus, by using the tilted pixels P' to remove the gaps between pixels P, a natural and smooth picture may be presented. Also, since the picture quality is much clearer, the eyes of the viewers would be less tired even when viewing for long periods.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

According to the invention of the foregoing composition, a tilting device may be provided, with which a smooth and natural display is acquired.

Also, the invention may provide a tilting device which allows more stable and accurate tilting.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A tilting device comprising:
   a first reflector having a first reflecting surface to reflect incident light along a first reflection path;
   a second reflector having a second reflecting surface inclined at a predetermined angle with regard to the first reflector surface;
   a holder attached to bottoms of the first reflector and the second reflector; and
   a driving part, which provides rotational force to the holder;
   wherein the first reflector and the second reflector are rotated by the driving part to sequentially reflect the light, and the second reflecting surface tilts the light by an amount less than a distance between pixels shown on a screen.

2. The tilting device as set forth in claim 1, wherein the light is emitted from a Digital Micro-mirror device.

3. The tilting device as set forth in claim 1, wherein the second reflector surface tilts light by an amount corresponding to ½ of a vertical distance between the pixels shown on the screen.

4. The tilting device as set forth in claim 1, wherein the first reflecting surface and the second reflecting surface are a pair of halves that form a circle.

5. The tilting device as set forth in claim 1, further comprising:
   an adhesion part formed between the first reflecting surface and the second reflecting surface to be blackened to prevent dispersion of the light.

6. The tilting device as set forth in claim 1, wherein the holder comprises a first holding groove and a second holding groove, and the first reflector is inserted and fixed in the first holding groove, and the second reflector is inserted and fixed in the second holding groove.

7. The tilting device as set forth in claim 1, wherein the first reflector and the second reflector are processed from a single mirror.

8. The tilting device as set forth in claim 1, wherein the driving part is coupled to a color wheel motor and rotated.

9. The tilting device as set forth in claim 8, wherein the driving part is coupled to a color wheel motor by a gear or a belt.

10. A tilting device comprising:
    a first reflector having a first reflecting surface;
    a second reflector having a second reflecting surface inclined at a predetermined angle with respect to the first reflector surface;

a holder to hold the first reflector and the second reflector; and a driving part to rotate the holder;

wherein the first reflector and the second reflector are rotated by the driving part to sequentially reflect light, and the predetermined angle between the first reflecting surface and the second reflecting surface corresponds to an amount less than a distance between pixels shown on a screen.

11. The tilting device as set forth in claim 10, wherein:

the first reflecting surface reflects the light along a first reflecting path;

the second reflecting surface reflects the light along a second reflecting path having an angle with the first reflecting path; and the angle corresponds to the predetermined angle.

12. An image projection device comprising:

a digital Micro-mirror device to emit light;

a screen to form an image according to the light; and a tilting device disposed between the digital micro-mirror device and the screen, and comprising:

a first reflector having a first reflecting surface;

a second reflector having a second reflecting surface inclined at a predetermined angle with regard to the first reflector surface;

a holder to hold the first reflector and the second reflector; and a driving part to provide a rotational force to the holder;

wherein the first reflector and the second reflector are rotated by the driving part to sequentially reflect the light.

13. The image projection device as set forth in claim 12, wherein the second reflecting surface is disposed to tilt the light by an amount less than a distance between pixels shown on the screen.

14. The image projection device as set forth in claim 12, wherein the light reflected from the first reflecting surface and the light reflected from the second reflecting surface are shifted from each other by an amount not greater than a distance between pixels shown on the screen.

15. The image projection device as set forth in claim 12, wherein:

the digital Micro-mirror device emits the light corresponding to an image;

the first surface reflects the light of the image to form a first image on the screen;

the second surface reflects the light of the image to form a second image on the screen; and the second image of the screen is spaced apart from the first image of the screen by a distance shorter than a distance between pixels of the image.

* * * * *